United States Patent
Iizuka et al.

(10) Patent No.: US 7,527,119 B2
(45) Date of Patent: May 5, 2009

(54) SWING ARM SUPPORT STRUCTURE IN A MOTORCYCLE, AND MOTORCYCLE INCORPORATING SAME

(75) Inventors: Chikashi Iizuka, Saitama (JP); Hiroyuki Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 11/296,862

(22) Filed: Dec. 7, 2005

(65) Prior Publication Data

US 2007/0007065 A1    Jan. 11, 2007

(30) Foreign Application Priority Data

Dec. 10, 2004    (JP)    ............... 2004-357750

(51) Int. Cl.
  *B62M 7/00*    (2006.01)
(52) U.S. Cl. ............... 180/227; 180/228; 280/284; 280/285
(58) Field of Classification Search ............... 180/219, 180/227, 228, 230; 280/284, 285
   See application file for complete search history.

(56) References Cited

U.S. PATENT DOCUMENTS

| | | | | |
|---|---|---|---|---|
| 4,345,664 A | * | 8/1982 | Anno et al. | ............... 180/230 |
| 6,513,613 B2 | * | 2/2003 | Suzuki et al. | ............... 180/227 |
| 6,808,465 B2 | * | 10/2004 | Kuga et al. | ............... 474/14 |
| 6,986,400 B2 | * | 1/2006 | Osada | ............... 180/228 |
| 7,182,167 B2 | * | 2/2007 | Sasamoto | ............... 180/219 |
| 7,360,620 B2 | | 4/2008 | Takenaka et al. | |
| 2001/0034280 A1 | * | 10/2001 | Kuga et al. | ............... 474/8 |
| 2002/0027034 A1 | * | 3/2002 | Tsutsumikoshi | ............... 180/227 |

FOREIGN PATENT DOCUMENTS

| | | |
|---|---|---|
| JP | 11-342754 | 12/1999 |
| JP | 2004-116423 | 4/2004 |

* cited by examiner

*Primary Examiner*—Paul N Dickson
*Assistant Examiner*—Marc A Scharich
(74) *Attorney, Agent, or Firm*—Carrier, Blackman & Associates, P.C.; William D. Blackman; Joseph P. Carrier

(57) ABSTRACT

A swing arm support structure is provided in a motorcycle, in which first and second support arm portions are provided on a front portion of a swing arm. The support arm portions are pivotally supported by a power unit through first and second pivot shafts, so that rigidity and strength of the paired support arm portions is ensured. A flange is formed on the first pivot shaft, which extends at least partially up to an outer edge of a power unit case and projects radially outwardly from an end portion of the first pivot shaft adjacent the case. The flange portion is removably attached to the case. An outer end of an output shaft extends through and is supported by the first pivot shaft, and this outer end projects outwards of the first support arm portion. A drive gear is fixed to the outer end portion of the output shaft.

21 Claims, 8 Drawing Sheets

SWING ARM SUPPORT STRUCTURE IN A MOTORCYCLE, AND MOTORCYCLE INCORPORATING SAME

CROSS-REFERENCE TO RELATED APPLICATIONS

The present invention claims priority under 35 USC 119 based on Japanese patent application No. 2004-357750, filed on Dec. 10, 2004. The subject matter of this priority document is incorporated by reference herein.

BACKGROUND OF THE INVENTION

1. Field of the Invention

The present invention relates to a swing arm support structure in a motorcycle. More particularly, the present invention relates to a swing arm support structure in which forwardly extending first and second swing arm support arm portions are pivotally supported by the power unit of the motorcycle.

2. Description of the Background Art

Motorcycles which include a swing arm between the motorcycle frame and the rear wheel are known to also include a swing arm support structure. Such a swing arm support structure in a motorcycle is disclosed, for example, in Japanese Patent Laid-open No. Hei 11-342754. This document discloses a pair of right and left support arm portions provided in a front portion of a swing arm, which support arm portions are pivotally supported by a power unit by means of a pair of right and left pivot shafts. The power unit is disposed between the right and left support arm portions.

In the swing arm support structure disclosed in Japanese Patent Laid-open No. Hei 11-342754, an outer end portion of one of the pair of right and left pivot shafts is incorporated in the pair of support arm portions provided in the front portion of the swing arm, and therefore it is difficult to ensure support rigidity and strength of the support arm portions.

The present invention has been accomplished in view of the above-mentioned circumstances. It is an object of the invention to provide a swing arm support structure in a motorcycle that easily ensures support rigidity and strength of one of a pair of support arm portions provided in a swing arm.

SUMMARY OF THE INVENTION

In order to achieve the above-mentioned object, according to a first aspect of the invention, a swing arm support structure is provided in a motorcycle. The swing arm includes forwardly extending first and second support arm portions provided on the right and left sides of a front portion of the swing arm. The rear portion of the swing arm supports a rear wheel through an axle, and a power unit is mounted on a body frame of the motorcycle. The power unit includes an engine and a transmission system. The transmission system, including an output shaft for imparting power to the rear wheel, is adapted to decelerate the output of the engine and transmit the decelerated output to the output shaft. The first support arm portion is pivotally supported by the power unit through a cylindrical first pivot shaft coaxial with the output shaft. The second support arm portion is pivotally supported by the power unit through a second pivot shaft coaxial with the first pivot shaft. The inventive swing arm support structure is characterized in that a flange portion is formed on the cylindrical first pivot shaft. The first pivot shaft extends through the first support arm portion, and the flange portion extends at least partially up to an outer edge of a power unit case. In addition, the flange projects sideways from an end portion of the first pivot shaft, so that the flange is located adjacent to the case side. The flange portion is removably attached to the case. An outer end of the transmission output shaft extends through and is supported by the first pivot shaft.

The outer end of the transmission output shaft projects outwards from the first support arm portion, and a driving force transfer gear, used for the transfer of power from the output shaft to the rear wheel, is fixed to the outer end portion of the output shaft at a position outside the first support arm portion.

A second aspect of the invention is characterized, in addition to the configuration of the first aspect of the invention, in that a plurality of case members are provided which constitute at least a part of the case of the power unit. The plurality of case members are clamped together using at least a portion of plural bolts, the plural bolts being used for mounting the flange portion to the case.

A third aspect of the invention is characterized, in addition to the configuration of the first or second aspects of the invention, in that the portion of the flange portion extending up to the outer edge of the case has a bent portion. The bent portion is bent to the case side, and is clamped to the case with bolts.

A fourth aspect of the invention is characterized, in addition to the configuration of any of the first through third aspects of the invention, in that a plurality of bolts for clamping the flange portion to the case are arranged radially outside the outer periphery of the driving force transfer gear with respect to a projection of the gear on a plane orthogonal to the axis of the output shaft.

According to the first aspect of the invention, since the first pivot shaft is a cylindrical shaft which extends through the first support arm portion of the swing arm, it is easy to ensure the rigidity and strength of the support arm portion by means of the pivot shaft. In addition, since a flange portion, having a portion extending up to an outer edge of the power unit case and which is relatively high in rigidity, is provided on the first pivot shaft and is attached to the case, rigidity is more easily ensured.

According to the second aspect of the invention, a plurality of case members, which constitute at least a part of the power unit, are clamped using at least a portion of plural bolts, which are for mounting the flange portion to the case. Since a part of the flange portion is clamped to a portion of the case which is made relatively high in rigidity for clamping thereto of the plural case members, not only the first pivot shaft mounting rigidity is enhanced, but also the number of bolts used is decreased.

According to the third aspect of the invention, in the flange portion of the first pivot shaft, the bent portion formed in the portion of the flange which extends up to the outer edge of the case, and the bent portion is clamped to the case with bolts. As a result, the heads of the bolts are disposed more toward the inside of the case. Therefore, it is possible to prevent an increase of body size such as the vehicle width, while avoiding interference with the swing arm.

Further, according to the fourth aspect of the invention, even when a large load from the output shaft acts on the first pivot shaft, the first pivot shaft can be fixed firmly to the case of the power unit. As a result, it is possible to further enhance the rigidity of the swing support portion of the swing arm through the first pivot shaft.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
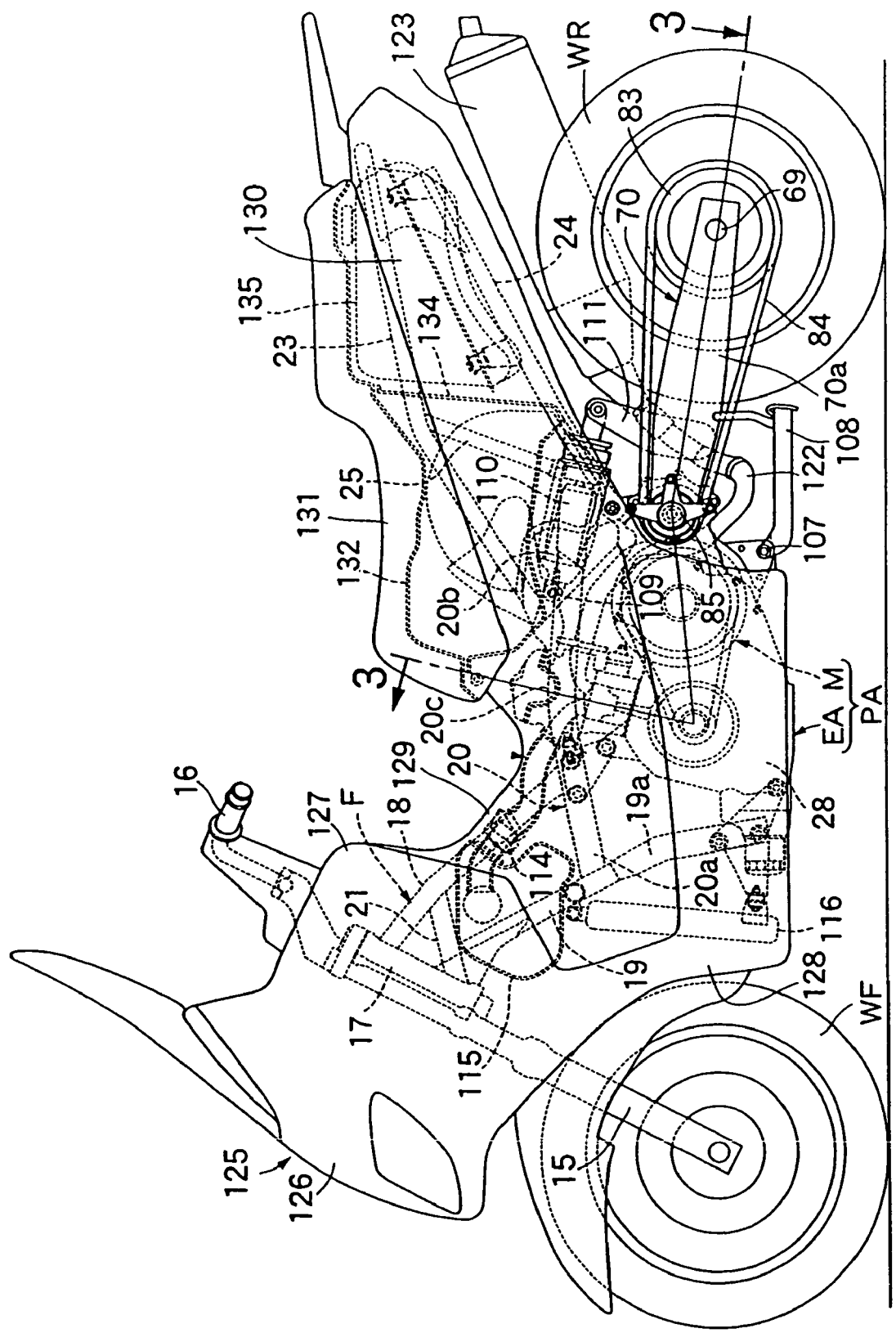
FIG. 1 is a side plan view of a motorcycle having a single cylinder engine, in which the motorcycle includes a swing arm supported by a swing arm support structure according to a first embodiment of the present invention.
Figure 2:
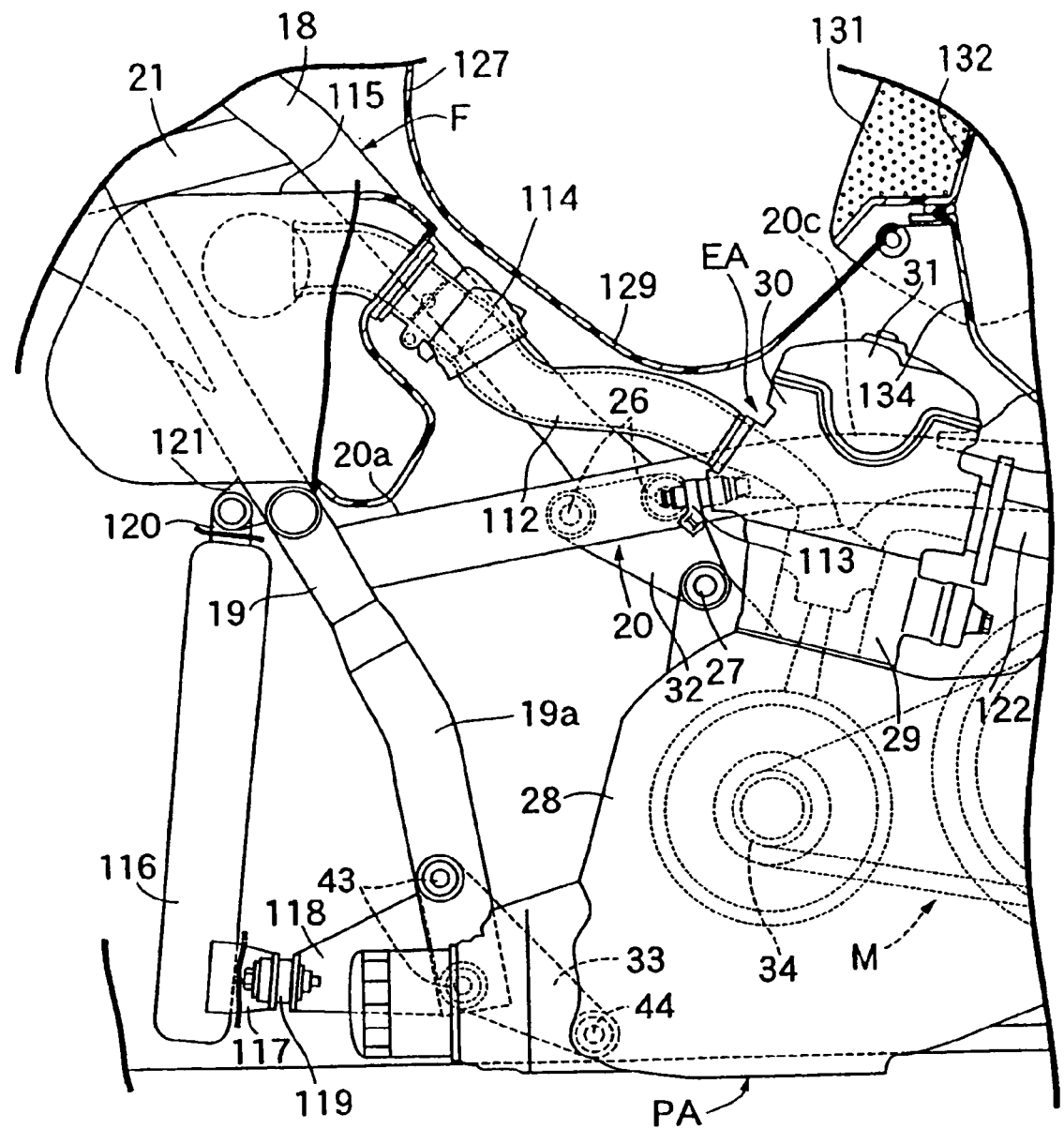
FIG. 2 is an enlarged side plan view in longitudinal section of a front portion of the motorcycle of FIG. 1, showing the front portion of the power unit secured to the vehicle frame using hangers.
Figure 3:
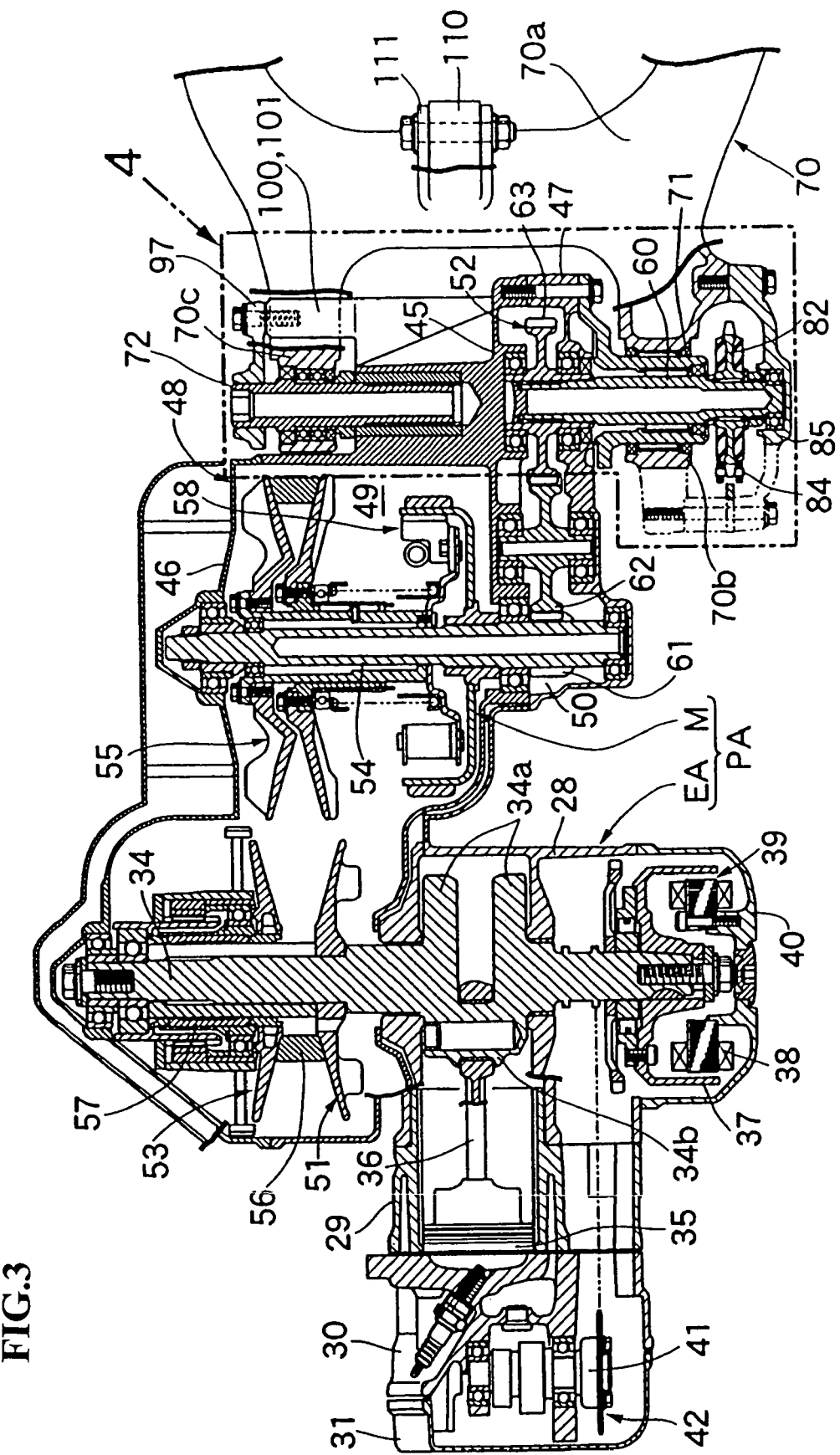
FIG. 3 is a sectional view of the power unit and a front portion of the swing arm, taken along line 3-3 in FIG. 1.
Figure 4:
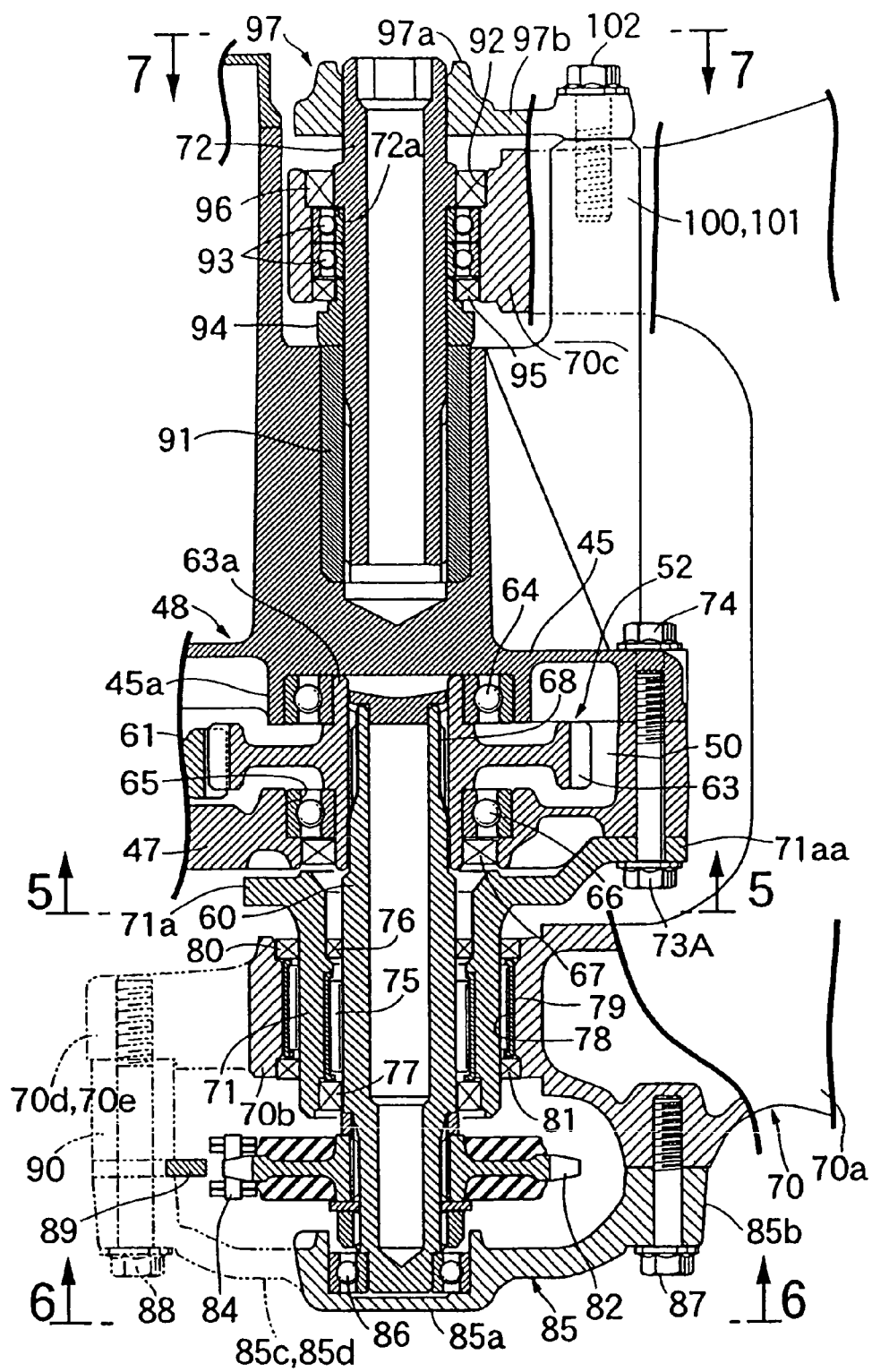
FIG. 4 is an enlarged detail view part of the power unit indicated by arrow 4 in FIG. 3.
Figure 5:
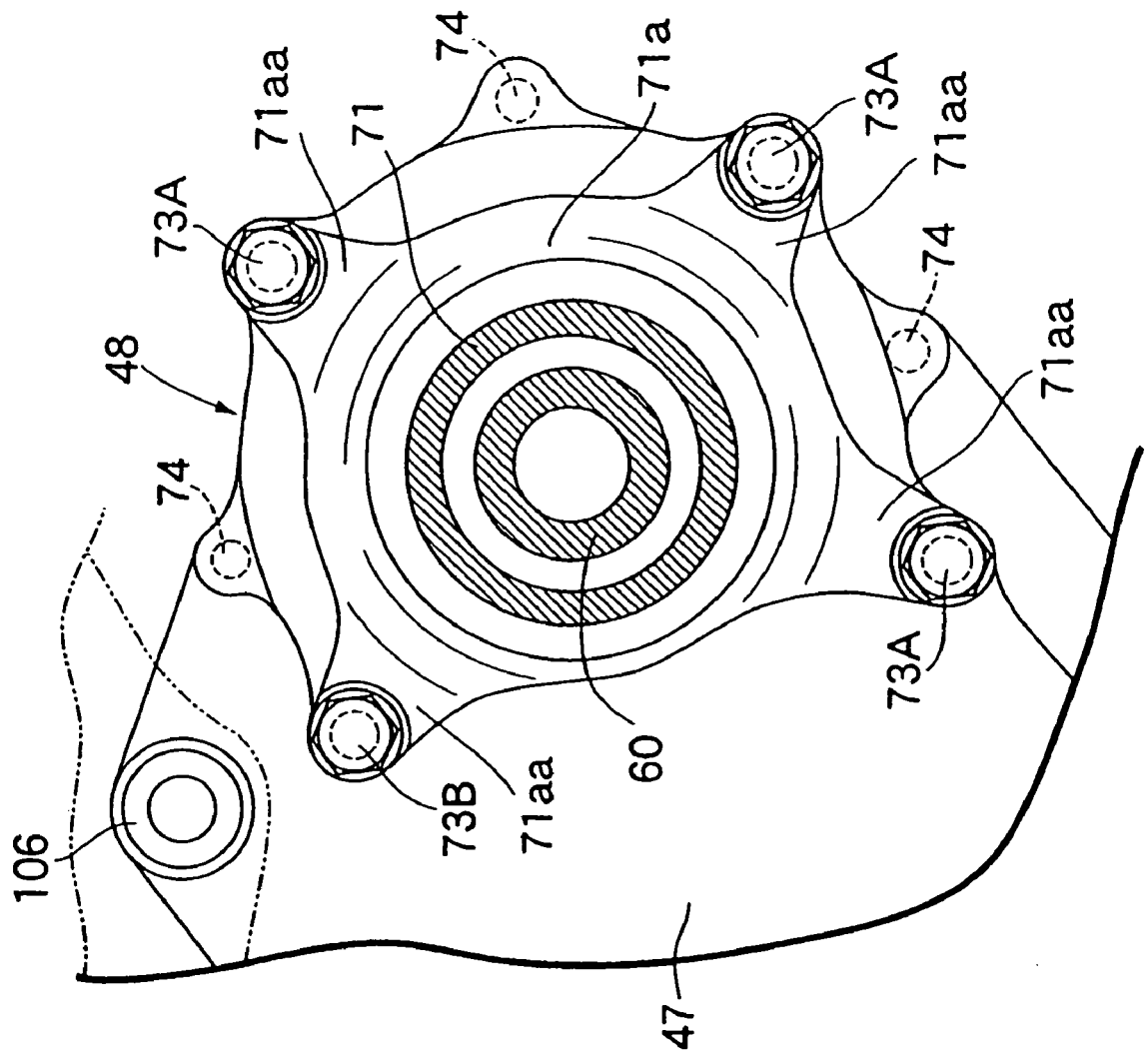
FIG. 5 is a partial sectional detail view of the flange of the first pivot shaft, taken on line 5-5 in FIG. 4.
Figure 6:
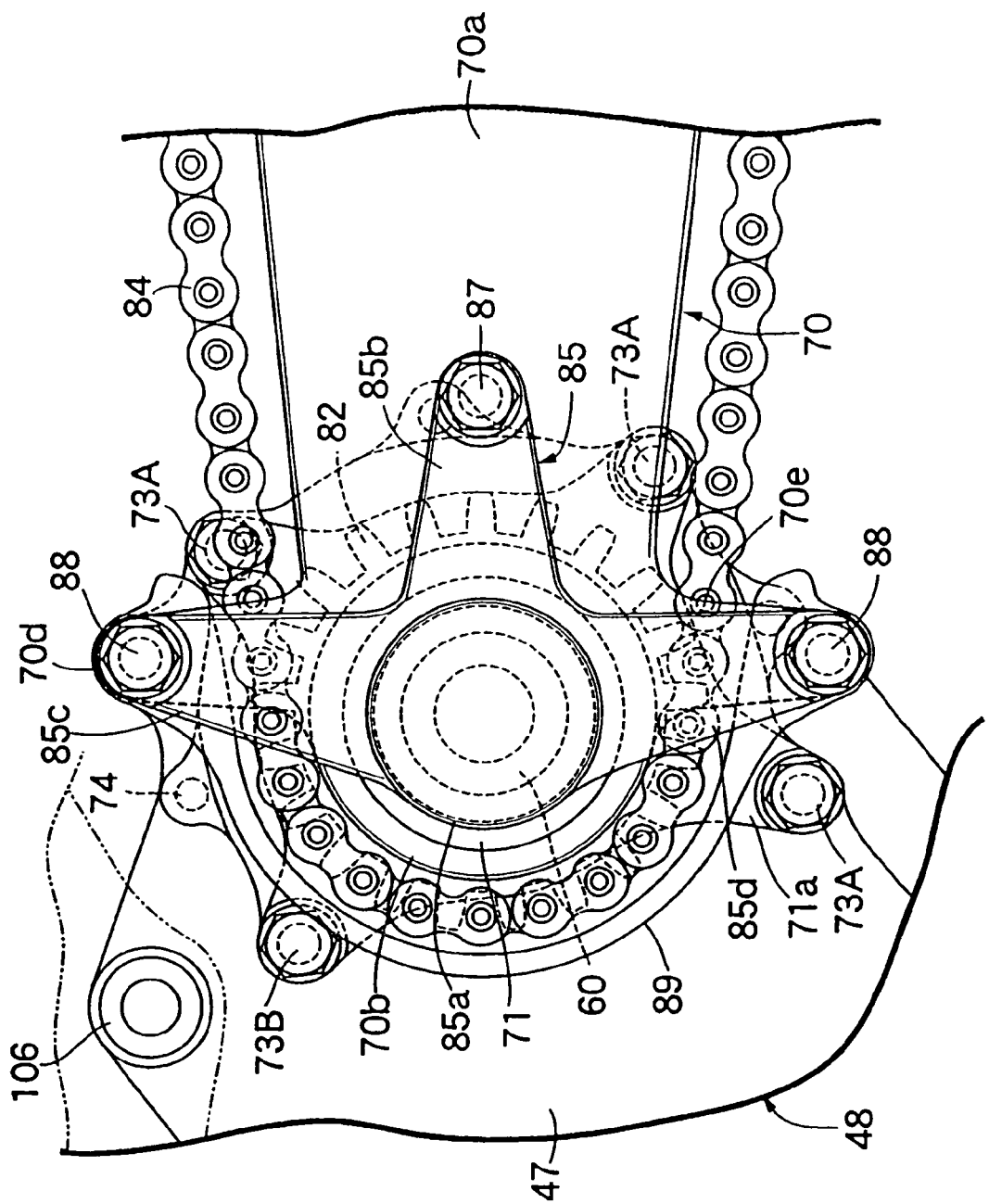
FIG. 6 is a view of the output shaft holder as seen in the direction of arrow 6-6 in FIG. 4.
Figure 7:
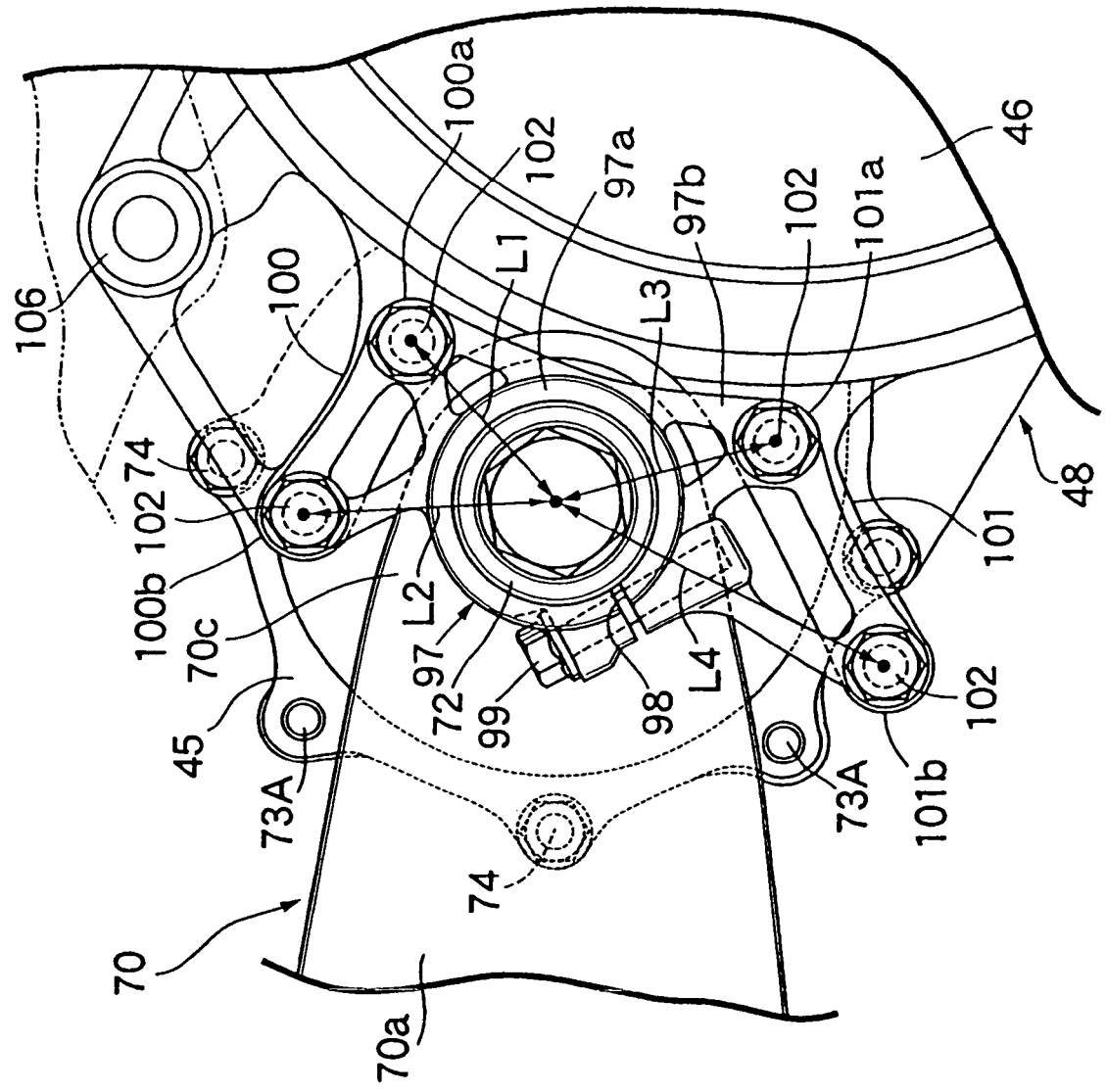
FIG. 7 is a view of the shaft holding member and second pivot shaft as seen in the direction of arrow 7-7 in FIG. 4.

FIGS. 1 to 7 illustrate a first embodiment of the present invention, of which FIG. 1 is a side plan view of a motorcycle incorporating the support structure hereof, FIG. 2 is an enlarged side plan view in longitudinal section of a front portion of the motorcycle, FIG. 3 is a sectional view taken on line 3-3 in FIG. 1, FIG. 4 is an enlarged detail view of part of the power unit indicated by arrow 4 in FIG. 3, FIG. 5 is a sectional view taken on line 5-5 in FIG. 4, FIG. 6 is a view as seen in the direction of arrow 6-6 in FIG. 4, and FIG. 7 is a view as seen in the direction of arrow 7-7 in FIG. 4.

Referring first to FIG. 1, a body frame F of the motorcycle is shown. The drawing shows a scooter-type motorcycle, but the inventive concept is not limited to this type of motorcycle. The body frame F includes a head pipe 17, which steerably supports a front fork 15, and a handlebar 16 connected to the front fork 15. The front fork 15 supports a front wheel WF through an axle. The body frame F further includes a pair of right and left down-pipes 18 extending backward and down from the head pipe 17, and a pair of right and left lower pipes 19 connected to the head pipe 17 below the down-pipes 18, and extending backward and downward at a gradient steeper than the down-pipes 18. The body frame F also includes a pair of right and left main pipes 20 connected to lower ends of the lower pipes 19 and extending backward. Rear ends of the down-pipes 18 are connected to intermediate portions of the main pipes 20.

A pair of engine hanger brackets 19a are joined to the lower ends of the lower pipes 19, and these brackets extend in the same general direction as the lower pipes 19. The main pipes 20 extend backward from a location near the joint between the lower pipes 19 and the engine hanger brackets 19a. Connecting plates 21 are provided, for reinforcement, between intermediate portions of the pair of right and left down-pipes 18 and the pair of right and left lower pipes 19.

Referring also to FIG. 2, the main pipes 20 each include an inclined front-half portion 20a extending backward and upward from, for example, the lower end of the associated lower pipe 19. The main pipes 20 each include an inclined rear-half portion 20b extending backward and downward, and a curved central portion 20c which is curved so as to protrude upwardly, as shown. The curved central portion 20c provides a connection between a rear end of the inclined front-half portion 20a and a front end of the inclined rear-half portion 20b. The portions 20a, 20b and 20c are integrally contiguous to one another. Each main pipe 20 is in a prismatic shape of a generally right-angled quadrilateral which is longer in the vertical direction than in the transverse direction. A lower end of the associated down-pipe 18 is welded to an intermediate portion of the inclined front-half portion 20a.

A front end of a seat rail 23, which extends backward and upward, is connected to the front side of the inclined rear-half portion 20b. The seat rail 23 is provided in a pair as right and left seal rails. Rear portions of the pair of right and left seat rails 23 are integrally connected to each other. A pair of rear pipes 24 are welded at respective front ends to rear ends of the inclined front-half portions 20b and at respective rear ends to the rear portions of the seat rails 23. Further, for reinforcement, connecting plates 25 are provided between intermediate portions of the pair of right and left seat rails 23 and the pair of right of left rear pipes 24.

A power unit PA is mounted on the body frame F to drive the rear wheel WR, and includes a four-cycle engine EA and a transmission system M. The transmission system M decelerates the output of the engine EA and transmits the decelerated output to a rear wheel WR. For example, the engine EA is constituted as a water-cooled single-cylinder engine. The engine EA includes a crankcase 28, a cylinder block 29 having a vertical cylinder axis and standing substantially upright from the crankcase 28, a cylinder head 30 joined to an upper end of the cylinder block 29, and a head cover 31 joined to the top of the cylinder head 30.

A pair of first engine hangers 32 are provided respectively in the inclined front-half portions 20a of both main pipes 20 at positions near the lower ends of the down-pipes 18 in the body frame F. In front of the cylinder block 29 of the engine EA, an upper portion of the crankcase 28 is supported by the first engine hangers 32. The cylinder block 29 and the cylinder head 30 are disposed between the curved portions 20c of both main pipes 20. A pair of second engine hangers 33 are secured, each using a pair of bolts 43, to lower ends of the engine hanger brackets 19a which are contiguous to the lower ends of the lower pipes 19. A front lower portion of the crankcase 28 is clamped to and supported by the second engine hangers 33 using bolts 44.

In this way the engine EA can be supported by both main pipes 20 at the highly rigid portion. In addition, the first engine hangers 32 are secured to the inclined front-half portions 20a of both main pipes 20 by tightening a pair of bolts 26 on each of the right and left sides. The pair of bolts 26 is positioned so as to sandwich an extension line of the axis of the associated down-pipe 18 from both sides. The crankcase 28 of the engine EA is supported by the first engine hangers 32 by tightening bolts 27 which are disposed respectively on extension lines of the axes of the down-pipes 18. Thus, the crankcase 28 can be supported by the first engine hangers 32 in high efficiency and with high rigidity.

In FIG. 3, a crank shaft 34, which is supported rotatably by the crankcase 28, is integrally provided with a pair of crank webs 34a, and a crank pin 34b which connects between the crank webs 34a. A piston 35, which is slidably fitted in the cylinder block 29, is connected through a connecting rod 36 to the crank pin 34b located between both crank webs 34a.

On the left side with respect to the advancing direction of the motorcycle, the end portion of the crank shaft 34 projects from the crankcase 28. An AC generator 39 is constituted by both a rotor 37, fixed to one end portion of the crank shaft 34, and a stator 38, accommodated within the rotor 37. The AC generator 39 is covered with a left cover 40 which is joined to the crankcase 28 and the stator 38 is fixed to the left cover 40.

A cam shaft 41 is rotatably supported in the cylinder head 30 so as to constitute a part of a valve operating mechanism used for opening and closing an intake valve and an exhaust valve (neither shown) disposed in the cylinder head 30. A timing transmission device 42 is disposed between the cam shaft 41 and the crank shaft 34, and is located between the crankcase 28 and the AC generator 39. The rotational power of the crank shaft 34 is reduced to one half by the timing transmission device 42 and is then transmitted to the cam shaft 41.

A case body 45, extending backward from the crankcase 28, is connected to the crankcase 28 on the right side with respect to the advancing direction of the motorcycle. A right cover 46 is secured to the right side of the case body 45, and a gear case 47 is secured to the right side of a rear portion of the case body 45. A transmission case 48 is constituted by the right cover 46, the gear case 47 and the case body 45. A transmission chamber 49 is formed between the case body 45 and the right cover 46. Further, a gear chamber 50 is formed between the case body 45 and the gear case 47.

The transmission system M includes a belt type continuously variable transmission 51 for transmitting the rotational power of the crank shaft 34 in a stepless manner, a reduction gear train 52 for decelerating the output of the continuously variable transmission 51, and an output shaft 60 for imparting the power decelerated by the reduction gear train 52 to the rear wheel WR. The continuously variable transmission 51 is accommodated within the transmission chamber 49, while the reduction gear train 52 is accommodated within the gear chamber 50.

The continuously variable transmission 51 includes a driving pulley 53 mounted on an end portion of the crank shaft 34 opposite to the AC generator and which faces the interior of the transmission chamber 49. The continuously variable transmission 51 also includes a driven pulley 55 mounted on a portion of a transmission shaft 54 which faces the interior of the transmission chamber 49. The transmission shaft 54 has an axis parallel to the crank shaft 34, and is rotatably supported in a rear portion of the transmission case 48. The continuously variable transmission 51 further includes an endless belt 56 entrained on both driving pulley 53 and driven pulley 55.

The driving pulley 53 causes the winding radius of the belt 56 to be changed by a sliding motion of a slide tube 57 which is adapted to slide axially with respect to the crank shaft 34 through operation of an electric motor (not shown) or the like. The driven pulley 55 causes the winding radius of the belt 56 to change in a direction opposite to that of the driving pulley 53 in accordance with a change of the belt winding radius on the driving pulley 53. A centrifugal clutch 58 is interposed between the driven pulley 55 and the transmission shaft 54.

The opposite end side of the transmission shaft 54, relative to the end on which the driven pulley 55 is mounted, is positioned so as to face the gear chamber 50. The reduction gear train 52, accommodated within the gear chamber 50, includes a driving gear 61 formed integrally on the opposite end side of the transmission shaft 54, an idle gear 62 meshing with the driving gear 61, and a driven gear 63 meshing with the idle gear 62. The idle gear 62 and the driven gear 63 are supported in the case body 45 and the gear case 47 so as to be each rotatable about an axis parallel to the transmission shaft 54.

Referring also to FIG. 4, the driven gear 63, as the final gear in the transmission system M, is integrally provided centrally with a cylindrical shaft portion 63a. One end of the shaft portion 63a is supported in a bearing housing 45a rotatably through a ball bearing 64. The bearing housing 45a is integral with a rear portion of the case body 45 of the transmission case 48. A circular opening 65, corresponding to the bearing housing 45a, is formed in a rear portion of the gear case 47 in the transmission case 48. The opposite end of the shaft portion 63a is disposed coaxially within the opening 65. In addition, a ball bearing 66 and an annular sealing member 67, positioned outside the ball bearing 66, are interposed between the outer periphery of the shaft portion 63a and the inner periphery of the opening 65.

The output shaft 60 extends through the rear portion of the gear case 47 and partially projects to the left side of the rear portion of the gear case 47. The output shaft 60 is splined to the shaft portion 63a of the driven gear 63. That is, the output shaft 60 is coaxially connected to the driven gear 63 in such a manner that it can be inserted and removed axially while being prevented from relative rotation about the axis thereof.

An axle 69 of the rear wheel WR is supported by a rear portion of a swing arm 70. The swing arm 70 is formed by integral molding so as to include a swing arm body 70a which is formed in a generally U shape so as to be positioned on both sides, and in front of, the rear wheel WR. The swing arm 70 also includes a first support arm portion 70b extending forward from a left front portion of the swing arm body 70a, and a second support arm portion 70c extending forward from a right front portion of the swing arm body 70a. The first support arm portion 70b and the second support arm portion 70c are arranged in parallel. The case body 45, which constitutes a part of the transmission case 48 and the rear portion of the gear case 47, is sandwiched between the second support arm portion 70c and the first support arm portion 70b. The first and second support arm portions 70b, 70c are pivotally supported through first and second pivot shafts 71, 72 in a rear portion of the power unit PA which is disposed between the support arm portions 70b and 70c. In this embodiment, the first and second pivot shafts 71, 72 are disposed coaxially with the output shaft 60.

Referring also to FIG. 5, the first pivot shaft 71 is removably mounted to an outer surface of the rear portion of the gear case 47 in the transmission case 48. The first pivot shaft 71 is formed in a cylindrical shape. This shape permits the projecting portion of the output shaft 60, which projects from the gear case 47, to extend through the interior of the first pivot shaft 71. As a result, the output shaft 60 is supported by the first pivot shaft 71. The first pivot shaft 71 extends through the first support arm portion 70b to pivotally support the first support arm portion 70b (FIG. 4). A sideways projecting flange portion 71a is integral with the gear case 47-side end of the first pivot shaft 71. In other words, the end of the first pivot shaft 71 adjacent to the gear case 47 is provided with a flange portion 71a that extends in a direction normal to the longitudinal axis of the first pivot shaft 71.

The flange portion 71a is removably clamped to the transmission case 48 with plural, (for example, four) bolts 73A, 73A, 73A, 73B which are arranged at spaced locations in the circumferential direction of the first pivot shaft 71. Radially distal ends of the four circumferentially spaced portions of the flange portion 71*a* are respectively formed with bent portions 71*aa*. The bent portions 71*aa* are displaced toward the transmission case 48 with respect to the flange portion 71*a*. The bent portions 71*aa* are clamped to the transmission case 48 with the bolts 73A, 73A, 73A, 73B. In a dismounted state with loosened bolts 73A, 73A, 73A, 73B, the bent portions 71*aa* come into abutment against the gear case 47 in the transmission case 48 along a plane orthogonal to the axis of the first pivot shaft 71 so as to be movable in a direction substantially orthogonal to the axis of the first pivot shaft 71. Therefore, in the dismounted state with loosened bolts 73A, 73A, 73A, 73B, the flange portion 71*a* can move along a plane substantially orthogonal to the axis of the first pivot shaft 71. With the output shaft 60 dismounted from the transmission case 48 of the power unit PA, the first pivot shaft 71 can be disengaged from the power unit PA by moving in a direction substantially orthogonal to the axis thereof.

The flange portion 71*a* is formed so that at least a part thereof extends up to an outer edge of the transmission case 48. Three of the bent portions 71*aa* extend up to the outer edge of the transmission case 48 and are clamped to the transmission case 48 with three bolts 73A, 73A, 73A out of the bolts 73A, 73A, 73A, 73B.

On the other hand, plural bolts 74 for clamping the case body 45 and the gear case 47 to each other are arranged in a mutually spaced relation on the outer periphery of the transmission case 48. The bolts 74 are inserted through the case body 45 and are threadably engaged with the gear case 47. The bolts 73A, arranged along the outer edge of the transmission case 48, are disposed at positions substantially corresponding to the arranged positions of the plural bolts 74, which are arranged along the outer peripheries of the case body 45 and the gear case 47, so as to mutually clamp the case body 45 and the gear case 47 as case members constituting at least a part of the transmission case 48. The bolts 73 are used not only for fixing the first pivot shaft 71 to the transmission case 48, but also for clamping the case body 45 and the gear case 47. The bolts 73A are inserted into the flange portion 71*a* and the gear case 47 so as to be threadably engaged with the case body 45.

A needle bearing 75, and annular sealing members 76 and 77, which are disposed on both inside and outside of the needle bearing 75, are interposed between the first pivot shaft 71 and the output shaft 60 inserted into the first pivot shaft 71.

In the support arm portion 70*b* of the swing arm 70, a support hole 78 is formed which receives the output shaft 60 and the first pivot shaft 71 therethrough. Annular sealing members 80 and 81, disposed on both inside and outside of the needle bearing 79, are interposed between the outer periphery of the first pivot shaft 71 and the inner periphery of the support hole 78.

An outer end portion of the output shaft 60 is projected outwards from the first support arm portion 70*b* of the swing arm 70. A driving sprocket 82, corresponding to the driving force transfer gear for the transfer of power from the output shaft 60 to the rear wheel WR, is fixed to the projecting portion of the output shaft 60 projecting from the swing arm 70. On the other hand, as shown in FIG. 1, a driven sprocket 83 is fixed to the axle 69 of the rear wheel WR on the left side with respect to the motorcycle advancing direction. An endless chain 84 is entrained on both driving sprocket 82 and driven sprocket 83.

Referring also to FIG. 6, when projected onto a plane which lies parallel to the paper surface of FIG. 6 and orthogonal to the axis of the output shaft 60, the plural bolts 73A, 73A, 73A, 73B for clamping the flange portion 71*a* of the first pivot shaft 71 to the transmission case 48, are arranged outside the outer periphery of the driving sprocket 82. In other words, the radial distance from an axis of the first pivot shaft 71 to each of the plural bolts 73A, 73A, 73A, 73B is greater than the radial distance from an axis of the first pivot shaft 71 to the outer periphery of the driving sprocket 82.

An output shaft holder 85, which covers the outer end portion of the output shaft 60, is mounted to an outer surface of a front end of the first support arm portion 70*b* in the swing arm 70. The output shaft holder 85 is integrally provided with a bearing housing portion 85*a* which is formed in a circular tray shape so as to cover the outer end of the output shaft 60. The output shaft holder 85 is also integrally provided with mounting arm portions 85*b*, 85*c* and 85*d* which extend outwards and sideways from three circumferentially spaced positions of the bearing housing portion 85*a*. The outer end portion of the output shaft 60 is rotatably supported in the bearing housing portion 85*a* through a ball bearing 86.

Of the mounting arm portions 85*b* to 85*d*, the mounting arm portion 85*b* extends in the rearward direction of the vehicle from the bearing housing portion 85*a*, and a distal end thereof is removably clamped to the left side face of the swing arm 70 with a bolt 87. The remaining mounting arm portions 85*c* and 85*d* are extended upward and downward respectively from the bearing housing portion 85*a*. Distal ends of the mounting arm portions 85*c* and 85*d* are removably clamped with a pair of bolts 88 to support plate portions 70*d* and 70*e* respectively, which are integral with the upper and lower sides of the first support arm portion 70*b* in the swing arm 70. When projected onto a plane which lies parallel to the paper surface of FIG. 6 and orthogonal to the axis of the output shaft 60, the bolts 87 and 88, 88, used for mounting the mounting arm portions 85*b* to 85*d* to the swing arm 70, are arranged at positions that do not overlap the bolts 73A, 73A, 73A, 73B, used for mounting the first pivot shaft 71 to the transmission case 48. In other words, when viewed from left side, the bolts 87, 88, 88 do not overlie the bolts 73A, 73A, 73A, 73B. With this arrangement, the support rigidity of the first support arm portion 70*b* is further enhanced by mutual compensation of the first pivot shaft 71 and the output shaft holder 85.

As stated above, the driving sprocket is fixed to an end portion of the output shaft 60. A front half portion of the driving sprocket 82 is disposed so as to be exposed forward from the bearing housing portion 85*a* of the output shaft holder 85. A protective plate 89 is disposed in front of the driving sprocket. The protective plate 89 is formed in a semicircular shape so as to cover the front half portion of the driving sprocket 82 from the front side.

Cylindrical spacers 90 are provided between the support plate portions 70*d* and 70*e* and the mounting arm portions 85*c* and 85*d*. One end of each of the cylindrical spacers 90 (see FIG. 4) abuts against the support plate portions 70*d* and 70*e*. The protective plate 89 is sandwiched in between the opposite ends of the spacers 90 and the mounting arm portions 85*c*, 85*d*. The bolts 88, which are inserted through the mounting arm portions 85*c*, 85*d*, the protective plate 89 and the spacers 90, are threadably engaged with the support plate portions 70*d* and 70*e*.

The second pivot shaft 72 extends through the second support arm portion 70*c* of the swing arm 70 and is removably fixed to the power unit PA. In this embodiment, the second pivot shaft 72 is a bolt threadably engaged with a cylindrical body 91 which is insert-connected to the case body 45 of the transmission case 48 in the power unit PA.

A support hole 92 for passage therethrough of the second pivot shaft 72 is formed in the second support arm portion 70*c* of the swing arm 70. A pair of ball bearings 93 are interposed between the outer periphery of the second pivot shaft 72 and the inner periphery of the support hole 92. Inner races of the ball bearings 93 are held between an annular stepped portion 72a, formed on the outer periphery of the second pivot shaft 72, and one end of a cylindrical spacer 94, which surrounds the second pivot shaft 72 coaxially with the opposite end thereof abutted against an outer end of the cylindrical body 91. An annular sealing member 95 is disposed inside both ball bearings 93 and between the outer periphery of the spacer 94 and the inner periphery of the support hole 92. Further, an annular sealing member 96 is disposed outside both ball bearings 93 and between the outer periphery of the second pivot shaft 72 and the inner periphery of the support hole 92.

Referring also to FIG. 7, an outer end portion of the second pivot shaft 72 is held fixedly by a shaft holding member 97 which is removably secured to the case body 45 of the transmission case 48 in the power unit PA. The shaft holding member 97 is a molded member, such as a cast member, and is integrally provided with a generally circular holding portion 97a having a slit 98 in one circumferential position, and a mounting portion 97b projecting sideways (radially outward) from the holding portion 97a. A bolt 99 is threadably engaged with the holding portion 97a so as to straddles the slit 98. By tightening the bolt 99 when the outer end portion of the second pivot shaft 72 is inserted into the holding portion 97a, the outer end portion of the second pivot shaft 72 is held fixedly by the holding portion 97a.

Plural (for example, two) boss portions 100 and 101 are provided which, in top view, project outwards relative to the second support arm portion 70c of the swing arm 70 while overlapping the second support arm portion 70c. The boss portions 100 and 101 are projected, for example, integrally so as to sandwich the second support arm portion 70c from above and below. Both boss portions 100 and 101 are arranged at positions deviated from the pivoting range of the second arm portion 70c of the swing arm 70.

Plural, (for example, a pair of) clamping seats 100a and 100b abut against the mounting portion 97b of the shaft holding member 97. Likewise, plural (for example, a pair of) clamping seats 101a and 101b are provided respectively at distal ends of at least one of the boss portions 100 and 101. In this embodiment, both boss portions 100 and 101 include a pair of clamping seats. The mounting portion 97b of the shaft holding member 97 is removably fixed to the clamping seats 100a, 101b, 101a and 101b with bolts 102.

The positions of the clamping seats 100a and 100b of the boss portion 100 are set in such a manner that the distance L1 between the front-side clamping seat 100a and the center of the second pivot shaft 72 is shorter than the distance L2 between the rear-side clamping seat 100b and the center of the second pivot shaft 72. Likewise, the positions of the clamping seats 101a and 101b of the boss portion 101 are set in such a manner that the distance L3 between the front-side clamping seat 101a and the center of the second pivot shaft 72 is shorter than the distance L4 between the rear-side clamping seat 101b and the center of the second pivot shaft 72. That is, the pair of clamping seats 100a and 100b and like pair of clamping seats 101a and 101b for clamping the second shaft holding member 97 are provided respectively in the pair of boss portions 100 and 101 which sandwich the second support arm portion 70c of the swing arm 70 from above and below. In addition, the positions of the clamping seats 100a, 100b, 101a and 101b in the boss portions 100 and 101 are set in such a manner that the distances from the center of the second pivot shaft 72 to the clamping seats 100a, 100b, 101a and 101b are smaller on the front clamping seats 100a and 101a side.

A pair of upwardly extending brackets 106 are provided in the rear portion of the transmission case 48 and are supported by rear end portions of the main pipes 20. As shown clearly in FIG. 1, a pair of main stand shafts 107 are coaxially provided in a rear lower portion of the transmission case 48 and a main stand 108 is supported pivotally by the main stand shafts 107. A cross pipe 109 is mounted bridging between the curved portions 20c of both main pipes 20. A rear shock absorber 110, having a longitudinally extending axis, is disposed between the cross pipe 109 and a shock absorber bracket 111 disposed in a front portion of the swing arm 70.

Referring to FIG. 2, an air intake pipe extends forward from the cylinder head 30. A downstream end of the air intake pipe 112 is connected to a side face on the front side of the cylinder head 30, and a fuel injection valve 113 is attached to the cylinder head 30 at a position near the connection of the intake pipe 112. An upstream end of the intake pipe 112 is connected to an air cleaner 115 through a throttle body 114.

A radiator 116 is provided for cooling engine cooling water which has been warmed by the water-cooled type engine EA. The radiator 116 is disposed below a front portion of the air cleaner 115 so as to be positioned in front of the engine EA. Mounting arm portions 117, projecting toward the engine hanger brackets 19a provided in the body frame F, are formed in a lower portion of the radiator 116. The mounting arm portions 117 are supported through mounting rubbers 119 by brackets 118 which are provided in the engine hanger brackets 19a. Mounting arm portions 120 are disposed on top of the radiator 116 so as to project toward the overlying lower pipes 19. The mounting arm portions 120 are supported through mounting rubbers (not shown) by brackets 121 which are provided in the lower pipes 19. That is, the radiator 116 is supported by the lower pipes 19 of the body frame F and the engine hanger brackets 19a.

An upstream end of an exhaust pipe 122 is connected to a rear side face of the cylinder head 30 in the engine EA. A downstream end of the exhaust pipe 122 is connected to an exhaust muffler 123 which is disposed on the right side of the rear wheel WR.

Referring to FIG. 1, the body frame F and the power unit PA are covered with a body cover 125 made of a synthetic resin. The body cover 125 includes a front cover 126 which covers a front portion of the head pipe 17 and an upper portion of the front wheel WF, and a center cover 127 which covers the head pipe 17 from the rear side, and which is contiguous to the front cover 126. The body cover 125 also includes a pair of right and left leg shields 128 joined to both right and left sides of the front cover 126 to cover the rider's legs from the front side, a floor tunnel portion 129 contiguous to both leg shields 128 and the center cover 127, and a rear cover 130 which covers both right and left sides of the rear portion of the body frame F.

A luggage box 134 is disposed under a rider seat 131 in such a manner that an upper-end opening thereof is openably closed by a bottom plate 132 of the rider seat 131. The luggage box 134 is supported by the main pipes 20 and the seat rails 23.

The luggage box 134 is disposed above the longitudinally extending rear shock absorber 110 provided between the cross pipe 109 of the body frame F and the swing arm 70. The bottom of the luggage box 134 is formed in a generally U-shaped cross sectional shape which is open downward so as to straddle the rear shock absorber 110 from above.

Behind the luggage box 134 is disposed a fuel tank 135 which can be supplied with fuel by opening the rider seat 131. The fuel tank 135 is elastically supported in rear portions of the rear pipes 24.

The operation of this first embodiment will now be described. The output shaft 60 of the power unit PA is connected to the driven gear 63 as the final gear in the transmission system M, so that the output shaft 60 can be inserted and removed in its axial direction while being incapable of relative rotation about the axis, and so that its outer end portion projects outwards of the swing arm 70. On the other hand, the first and second support arm portions 70b, 70c, provided on the respective right and left sides of the front portion of the swing arm 70, are pivotally supported by the transmission case 48 of the power unit PA through the cylindrical first pivot shaft 71, which permits the output shaft 60 to extend coaxially therethrough, and the second pivot shaft 72, which is coaxial with the first pivot shaft 71. The first pivot shaft 71 is removably mounted to the transmission case 48 so that, in a dismounted state, it can move along a plane nearly orthogonal to its axis and away from the transmission case 48 of the power unit PA. The second pivot shaft 72 is removably mounted to the transmission case 48 of the power unit PA so that, in a released state, in can move axially away from the transmission case 48.

According to such a pivotal support structure for supporting the swing arm 70 with respect to the power unit PA, when removing the swing arm 70 from the power unit PA, there are performed disconnecting work for disconnecting the output shaft 60 from the power unit PA while the output shaft holder 85 is removed from the swing arm 70, releasing work for releasing the first pivot shaft 71 from the power unit PA, and work for disconnecting the second pivot shaft 72 from the power unit PA. Thereafter, the swing arm 70 is removed from the power unit PA. For mounting the swing arm 70 to the power unit PA, the above operations for removal are performed in reverse. Thus, not only it is possible to facilitate the work of removing and mounting the swing arm 70 relative to the power unit PA, but also it is possible to make dividing of the swing arm 70 unnecessary and thereby reduce the number of parts. Moreover, the second pivot shaft 72, in a released state thereof, is removably fixed to the power unit PA in the axial direction from the power unit, whereby, when mounting or dismounting the swing arm 70 to or from the power unit PA, the second pivot shaft 72 can be kept disconnected from the power unit PA so as not to obstruct the mounting or dismounting work, and hence it is possible to improve the efficiency of the work.

Since the swing arm 70 is formed by integral molding, not only it is possible to reduce the number of parts but also it is possible to improve the mounting accuracy of the swing arm 70 for the power unit PA. In addition, it becomes unnecessary to use a clamping structure for clamping plural members with bolts or the like to assemble the swing arm 70 and hence it is possible to make the swing arm 70 itself highly rigid and reduce the unsprung weight.

Since the swing arm 70 is pivotally supported by the power unit PA, which is mounted on the body frame F so as to drive the rear wheel WR, it is unnecessary to dispose the body frame F near the pivotally supported portion of the swing arm 70, so that a stable pivotal motion of the swing arm 70 can be ensured while utilizing the rigidity of the power unit PA.

The first pivot shaft 71 is formed in a cylindrical shape so as to extend through, and pivotally support, the first support arm portion 70b. The flange portion 71a projects sideways (radially outward) from the transmission case 48-side end portion of the first pivot shaft 71 so as to extend at least partially up to the outer edge of the transmission case 48 in the power unit PA, and is removably mounted to the transmission case 48. An outer end of the output shaft 60, extending through and supported by the first pivot shaft 71, is projected outwards of the first support arm portion 70b. The driving sprocket 82 is fixed to the outer end of the output shaft 60 at a position outside the first support arm portion 70b. Therefore, it is easy to ensure the support rigidity of the swing arm 70 by means of the first pivot shaft 71, and it becomes easy to ensure the strength of the support portion. Since the flange portion 71a, having a portion extending up to the outer edge of the transmission case 48 of the power unit PA, and which is relatively high in rigidity, is formed on the first pivot shaft 71 and is mounted to the transmission case 48, the required rigidity is ensured.

Since the case body 45 and the gear case 47, corresponding to plural case members which constitute at least a part of the transmission case 48, are mounted using bolts 73A which are at least a portion of plural bolts 73A, 73A, 73A and 73B for mounting the flange portion 71a to the transmission case 48, the mounting rigidity of the first pivot shaft 71 is enhanced by clamping a part of the flange portion 71a to the portion which is made relatively high in rigidity for mounting the case body 45 and the gear case 47. In addition, it is possible to reduce the required number of bolts for the mounting of the case body 45 and the gear case 47 and for the mounting of the first pivot shaft 71 to the transmission case 48.

Since most bolts 73A of the bolts 73A, 73A, 73A and 73B for fixing the first pivot shaft 71 to the transmission case 48 are arranged in the outer periphery portion of the transmission case 48 when viewed from the side, the first pivot shaft 71 can be fixed to the highly rigid portion of the transmission case 48. Moreover, it is possible to prevent deformation of the transmission case 48 in the gear case 47 side even if a load acts on the first pivot shaft 71 while the motorcycle is running. Consequently, it is possible to prevent the occurrence of unnecessary strain in the shaft portions of the gears 61 to 63 within the gear case 47.

Since the bent portions 71aa, which are displaced toward the transmission case 48, are formed in the portion of the flange portion 71a which extend up to the outer edge of the transmission case 48 and are clamped to the transmission case 48 with bolts 73A, 73A, 73A, the heads of the bolts 73A can be positioned more inside (that is, toward the transmission case 48) and it is possible to prevent an increase of a body size such as the vehicular width while avoiding interference with the swing arm 70.

Since the plural bolts 73A, 73A, 73A and 73B for clamping the flange portion 71a to the transmission case 48 are arranged outside the outer periphery of the driving sprocket 82 as viewed from the side, the first pivot shaft 71 can be fixed firmly to the transmission case 48 in the power unit PA, and the rigidity of the pivotal support portion of the swing arm 70 by the first pivot shaft 71 can be further enhanced, even when a large load acts on the first pivot shaft 71 from the output shaft 60.

Since the output shaft holder 85 is removably mounted to the front portion of the swing arm 70 so as to cover and rotatably support the outer end portion of the output shaft 60, the output shaft holder 85 serves also as a support member and a cover member for the output shaft 60. As a result, it is possible to not only improve the appearance of the vehicle but also support the output shaft 60 more firmly.

Since the outer end portion of the second pivot shaft 72 extends through the swing arm 70, is threadably engaged with the transmission case 48 in the power unit PA, and is held fixedly by the shaft holding member 97 which is removably mounted to the plural boss portions 100 and 101 of the transmission case 48 in the power unit PA, it is possible to attain a straddled support structure of the second pivot shaft 72 for the power unit PA. By doing so, the rigidity of the second pivot shaft 72 is enhanced, and the pivotable support of the swing arm 70 is more stable by means of a simple configuration in which the second pivot shaft 72 is supported by the power unit PA and the shaft holding member 97. Moreover, by adjusting the rigidity of the shaft holding member 97, it is possible to adjust the rigidity of the second pivot shaft 72 to an appropriate value according to the model of a vehicle. Further, the second pivot shaft 72, threadably engaged with the power unit PA, can be prevented from becoming loose by reducing the number of parts. Because of a simple configuration, an increase of weight and that of cost are relatively small. Further, since the power unit PA can be disposed inside the swing arm 70, it is possible to enhance the layout freedom of the vehicle body.

The shaft holding member 97 is formed in a substantially circular shape so as to permit the outer end portion of the second pivot shaft 72 to pass therethrough. The shaft holding member 97 includes a holding portion 97a having a slit 98 in one circumferential position. The second pivot shaft 72 is supported on shaft holding member 97 by a bolt 99 which straddles the slit 98 and is threadably engaged with the holding portion 97a. Therefore, the outer end portion of the second pivot shaft 72 can be fixedly held by a simple configuration. Further, the rigidity of the second pivot shaft 72 can be enhanced. Furthermore, the second pivot shaft 72 can be held and released easily.

The transmission case 48 in the power unit PA is provided with plural (for example, a pair of) boss portions 100 and 101 for removable mounting thereto of the shaft holding member 97. Out of the boss portions 100 and 101, those overlapping the swing arm 70 in top view are disposed at positions deviated from the pivoting range of the swing arm 70. Therefore, not only can the second pivot shaft 72 be firmly fixed while ensuring the pivoting stroke of the swing arm 70, but also the shaft holding member 97 is compactly constructed, thus permitting contribution to the reduction of cost.

Since at least a portion of the boss portions 100 and 101, (both boss portions 100 and 101 in this embodiment), are provided in the transmission case 48 of the power unit PA so as to project outwards of the swing arm 70, the shaft holding member 97 can be compactly constructed so as to minimize its concave and convex portions. Therefore, although in this embodiment the shaft holding member 97 is a molded product such as a cast product, the shaft holding member 97 can alternatively be fabricated by pressing, for example.

Further, the plural clamping seats 100a, 100b, 101a and 101b for clamping the shaft holding member 97 are formed in at least one (both in this embodiment) of the pair of boss portions 100 and 101 of the transmission case 48 in the power unit PA at positions which sandwich the support arm portion 70c of the swing arm 70 from above and below. The positions of the clamping seats 100a, 100b, 101a and 101b are set in such a manner that in the boss portions 100 and 101 the distances from the center of the second pivot shaft 72 to the clamping seats 100a, 100b, 101a and 101b become smaller in the front-side clamping seats 100a and 101a. Therefore, the shaft holding member 97 can be fixed firmly to the boss portions 100 and 101, and can be disposed efficiently and compactly while ensuring a required clearance with respect to the swing arm 70.

Figure 8:
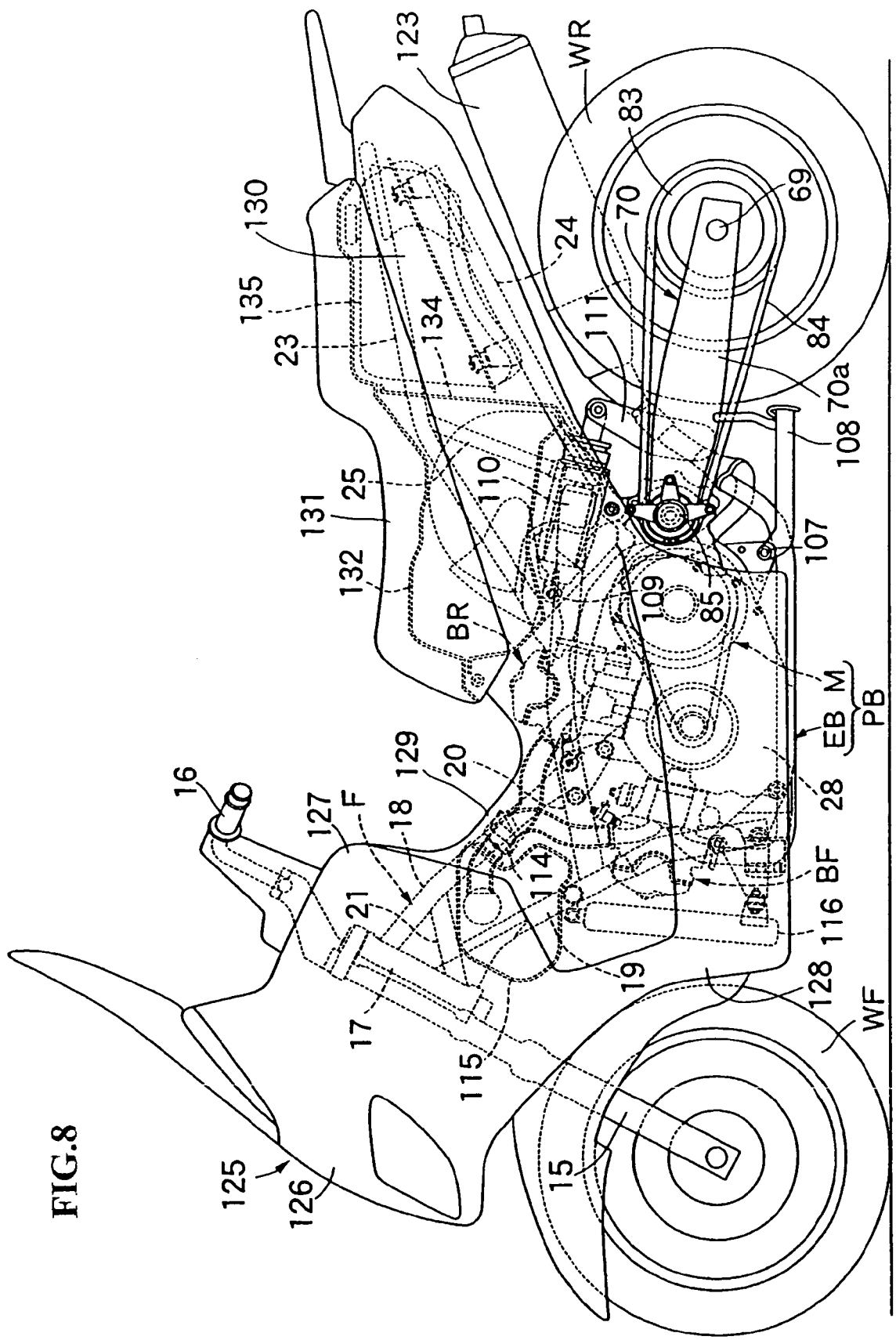
FIG. 8 is a side plan view of a motorcycle having a two-cylinder V-type engine, in which the motorcycle includes a swing arm supported by a swing arm support structure according to a second embodiment of the present invention.

FIG. 8 is a side view of a motorcycle according to a second embodiment of the present invention, in which the portions common to the above first embodiment are identified by the same reference numerals as in the first embodiment.

A power unit PB is provided which includes a four-cycle engine EB, and a transmission system M for decelerating the output of the engine EB and transmitting the decelerated output to the rear wheel WR. The power unit PB is mounted on a body frame F of the motorcycle of a scooter type to drive a rear wheel WR. For example, the engine EB is constructed as a water-cooled two-cylinder V-type engine and includes a rear bank BR rising upward from a crankcase 28 and a front bank BF extending forward from the crankcase 28. The front bank BF has a cylinder axis which is slightly inclined forwardly upward so as to form V shape conjointly with the rear bank BR.

A front portion of a swing arm 70 whose rear portion supports the rear wheel WR through an axle is pivotally supported by the power unit PB using the same support structure as that in the first embodiment.

Also, the second embodiment provides the same effects and benefits as in the previous first embodiment.

Although embodiments of the present invention have been described above, the present invention is not limited to the above embodiments, but various design modifications may be made without departing from the present invention described in the claims.

For example, although in the above embodiments the first and second pivot shafts 71, 72 can be inserted and removed axially with respect to the power units PA and PB, the present invention is also applicable to a swing arm support structure which makes the axial insertion and removal impossible.

What is claimed is:

1. A swing arm support structure in a motorcycle, the motorcycle comprising:
   a vehicle body frame;
   a rear wheel;
   a power unit mounted on the vehicle body frame, said power unit including a power unit case, an engine and a transmission system, said transmission system including an output shaft for imparting power to the rear wheel and being adapted to decelerate the output of said engine and transmit the decelerated output to the output shaft, said transmission system further including a drive sprocket for transferring power from said output shaft to said rear wheel, the drive sprocket being fixed adjacent to an outer end of the output shaft; and
   a swing arm extending between the rear wheel and the vehicle body frame, the swing arm comprising a front portion which includes forwardly extending first and second support arm portions provided on the right and left sides of the front portion, and a rear portion which supports the rear wheel through an axle,
   wherein said swing arm support structure comprises:
   a first pivot shaft and a second pivot shaft, the first pivot shaft being cylindrical and oriented coaxially with said output shaft, the second pivot shaft oriented coaxially with the first pivot shaft, and
   said first support arm portion is pivotally supported by said power unit through the first pivot shaft, and said second support arm portion is pivotally supported by said power unit through the second pivot shaft,
   the first pivot shaft extends through said first support arm portion, and
   a flange portion is formed on the first pivot shaft,
      said flange portion:
         extending radially outwardly at least partially up to an outer edge of said power unit case,
         projecting from an end portion of said first pivot shaft, the end portion located adjacent said power unit case, and
         being removably attached to said power unit case,
   wherein said output shaft extends through and is supported by said first pivot shaft, the outer end of the output shaft projects outwardly from said first support arm portion, and the drive sprocket is fixed adjacent to the outer end portion of the output shaft at a position such that the drive sprocket resides outside said first support arm portion.

2. The swing arm support structure in a motorcycle according to claim 1, wherein said power unit case comprises:
   a plurality of flange bolts for mounting said flange portion to said power unit case; and
   a plurality of case members which constitute at least a portion of said power unit case,
   wherein said plurality of case members are clamped together using at least a portion of said plurality of flange bolts.

3. A swing arm support structure in a motorcycle according to claim 1, wherein a portion of the flange portion which resides adjacent to the outer edge of the power unit case comprises a bent portion, the bent portion comprising a displacement of the flange portion in a direction toward the case, said bent portion being clamped to said power unit case with flange bolts.

4. The swing arm support structure in a motorcycle according to claim 1, wherein a plurality of bolts for clamping said flange portion to said power unit case are disposed outside an outer periphery of said drive sprocket with respect to a radial direction of the output shaft, when viewed from a side of the motorcycle.

5. The swing arm support structure in a motorcycle according to claim 1, wherein the swing arm support structure further comprises an output shaft holder configured to rotatably support the outer end of the output shaft.

6. The swing arm support structure in a motorcycle according to claim 5, wherein the output shaft holder is secured to the swing arm using a plurality of elongated mounting arm portions, the mounting arm portions extending between the output shaft holder and the swing arm, wherein at least one of the mounting arm portions is fixed to the swing arm above the output shaft holder, at least one of the mounting arm portions is fixed to the swing arm at a location rearward of the output shaft holder, and at least one of the mounting arm portions is fixed to the swing arm at a location below the output shaft holder.

7. The swing arm support structure in a motorcycle according to claim 1, wherein the second pivot shaft is maintained within the second support arm portion by means of a shaft fixing member,
   the shaft fixing member comprising an annular portion and at least one seat portion connected to the annular portion,
   the annular portion of the shaft fixing member suffounding a circumference of the second pivot shaft, and
   the at least one seat portion fixing the annular portion to the swing arm.

8. A swing arm support structure in a motorcycle, the motorcycle comprising:
   a vehicle body frame;
   a rear wheel;
   a power unit mounted on the vehicle body frame, said power unit including a power unit case, an engine and a transmission system, said transmission system including an output shaft for imparting power to the rear wheel and being adapted to decelerate the output of said engine and transmit the decelerated output to the output shaft; and
   a U-shaped swing arm extending between the rear wheel and the vehicle body frame, the swing arm comprising a front portion which includes a forwardly extending first support arm portion provided on the right side of the front portion, and a forwardly extending second support arm portion provided on the left side of the front portion, the swing arm further comprising a rear portion which supports the rear wheel through an axle, wherein
   said swing arm support structure comprises a first pivot shaft and a second pivot shaft, the first pivot shaft comprising a hollow cylindrical shape,
   the first pivot shaft, the second pivot shaft, and the output shaft are mutually coaxial,
   the first pivot shaft pivotally supports said first support arm portion on said power unit,
   the second pivot shaft pivotally supports said second support arm portion on said power unit,
   the first pivot shaft extends through said first support arm portion, and
   a flange portion is formed on the first pivot shaft,
      said flange portion projecting from an end portion of said first pivot shaft, the end portion of said first pivot shaft located adjacent said power unit case,
      the flange portion being removably attached to said power unit case, and
      at least a portion of said flange portion extending radially outwardly to an outer edge of said power unit case,
   wherein said output shaft extends through an interior space of the first pivot shaft, and is supported by said first pivot shaft, and an outer end of the output shaft projects outwardly from said first support arm portion to a location laterally outside said first support arm portion.

9. The swing arm support structure of claim 8, wherein the transmission system further comprises a drive sprocket for transferring power from said output shaft to said rear wheel, the drive sprocket being fixed adjacent to the outer end of the output shaft such that the drive sprocket resides laterally outside said first arm support portion.

10. The swing arm support structure in a motorcycle according to claim 8, wherein said power unit case comprises:
    a crankcase portion, a case body portion extending from a side of the crankcase portion, and a gear case portion disposed at a side of the case body portion; and
    a plurality of flange bolts for mounting said flange portion to said power unit case,
    wherein the case body portion and the gear case portion are clamped together using at least one of said plurality of flange bolts.

11. The swing arm support structure in a motorcycle according to claim 8, wherein the peripheral edge portions of the flange portion comprise a bent portion, the bent portion comprising a displacement of the flange portion in a direction toward the power unit case such that the bent portion resides in a plane parallel to a plane comprising a central portion of said flange portion, said bent portion being clamped to said power unit case with flange bolts.

12. The swing arm support structure in a motorcycle according to claim 8, wherein a plurality of bolts for clamping said flange portion to said power unit case are disposed outside an outer periphery of said drive sprocket with respect to a radial direction of the output shaft, when viewed from a side of the motorcycle.

13. The swing arm support structure in a motorcycle according to claim 8, wherein the swing arm support structure further comprises an output shaft holder configured to rotatably support the outer end of the output shaft.

14. The swing arm support structure in a motorcycle according to claim 13, wherein the output shaft holder is secured to the swing arm using a plurality of elongated mounting arm portions, the mounting arm portions extending between the output shaft holder and the swing arm, wherein at least one of the mounting arm portions is fixed to the swing arm above the output shaft holder, at least one of the mounting arm portions is fixed to the swing arm at a location rearward of the output shaft holder, and at least one of the mounting arm portions is fixed to the swing arm at a location below the output shaft holder.

15. The swing arm support structure in a motorcycle according to claim 8, wherein the second pivot shaft is maintained within the second support arm portion by means of a shaft fixing member,
- the shaft fixing member comprising an annular portion and at least one seat portion connected to the annular portion,
- the annular portion of the shaft fixing member surrounding a circumference of the second pivot shaft, and
- the at least one seat portion fixing the annular portion to the swing arm.

16. The swing arm support structure in a motorcycle according to claim 11, wherein the swing arm support structure further comprises an output shaft holder configured to rotatably support the outer end of the output shaft, the output shaft holder being secured to the swing arm using a plurality of mounting arm portions, the plural mounting arm portions extending between the output shaft holder and the swing arm, each of the mounting portions secured to the swing arm using mounting portion bolts, wherein when viewed from the side of the vehicle, the mounting portion bolts do not overlie the flange bolts.

17. A motorcycle, comprising:
- a vehicle body frame;
- a rear wheel;
- a power unit mounted on the vehicle body frame, said power unit including a power unit case, an engine and a transmission system, said transmission system including an output shaft for imparting power to the rear wheel and being adapted to decelerate the output of said engine and transmit the decelerated output to the output shaft, said transmission system further including a drive sprocket for transferring power from said output shaft to said rear wheel, the drive sprocket being fixed adjacent to an outer end of the output shaft; and
- a swing arm extending between the rear wheel and the vehicle body frame, the swing arm comprising a front portion which includes forwardly extending first and second support arm portions provided on the right and left sides of the front portion, and a rear portion which supports the rear wheel through an axle, and
- a swing arm support structure, comprising:
- a first pivot shaft and a second pivot shaft, the first pivot shaft being cylindrical and oriented coaxially with said output shaft, the second pivot shaft oriented coaxially with the first pivot shaft,
- wherein said first support arm portion is pivotally supported by said power unit through the first pivot shaft, and said second support arm portion is pivotally supported by said power unit through the second pivot shaft,
- wherein the first pivot shaft extends through said first support arm portion, and a flange portion is formed on the first pivot shaft,
- said flange portion:
  - extending radially outwardly at least partially up to an outer edge of said power unit case,
  - projecting from an end portion of said first pivot shaft, the end portion located adjacent said case of said power unit, and
  - being removably attached to said power unit case,
- wherein the output shaft extends through and is supported by said first pivot shaft, the outer end of the output shaft projects outwardly from said first support arm portion, and the drive sprocket is fixed adjacent to the outer end portion of the output shaft at a position such that the drive sprocket resides outside said first support arm portion.

18. The motorcycle of claim 17, wherein said power unit case comprises:
- a plurality of flange bolts for mounting said flange portion to said power unit case; and
- a plurality of case members which constitute at least a part of said power unit case,
- wherein said plurality of case members are clamped together using at least a portion of said plurality of flange bolts.

19. The motorcycle of claim 17, wherein a portion of the flange portion which resides adjacent to the outer edge of the power unit case comprises a bent portion, the bent portion comprising a displacement of the flange portion in a direction toward the case, said bent portion being clamped to said case with flange bolts.

20. The motorcycle of claim 17, wherein a plurality of bolts for clamping said flange portion to said power unit case are disposed outside an outer periphery of said drive sprocket with respect to a radial direction of the output shaft, when viewed from a side of the motorcycle.

21. The motorcycle of claim 17, wherein the swing arm support structure further comprises an output shaft holder configured to rotatably support the outer end of the output shaft.

* * * * *